April 16, 1968  A. C. DIANI  3,378,217
TRIM DISCONNECT DEVICE FOR AN AIRCRAFT CONTROL SYSTEM
Filed Sept. 2, 1966  2 Sheets-Sheet 1

INVENTOR.
ARTHUR C. DIANI
BY
AGENT

INVENTOR.
ARTHUR C. DIANI

United States Patent Office 3,378,217
Patented Apr. 16, 1968

3,378,217
TRIM DISCONNECT DEVICE FOR AN
AIRCRAFT CONTROL SYSTEM
Arthur C. Diani, Clifton, N.J., assignor to The Bendix
Corporation, a corporation of Delaware
Filed Sept. 2, 1966, Ser. No. 576,873
9 Claims. (Cl. 244—77)

This invention relates to aircraft control systems and, more particularly, to a system for controlling an aircraft having a control surface equipped with a trim tab.

In order to neutralize control pressures, aircraft control surfaces must be trimmed. The primary surface for controlling the pitch attitudes of an aircraft, for example, is the elevator which is hinged to the horizontal stabilizer of the craft. Hinged to the aft portion of the elevator is a small auxiliary control surface called a trim tab. In order to control the pitch of the craft the elevator is displaced up or down. The elevator is trimmed by displacing the trim tab in the opposite direction.

When the aircraft is automatically controlled, the signal that operates the elevator control motor also operates the trim tab control motor which counterpositions the trim tab, thereby trimming the elevator by cancelling the moment about the hinge axis of the elevator, Such a system is shown in U.S. Patent No. 2,733,879, granted on Feb. 7, 1956 to Paul M. Noxon, and assigned to The Bendix Corporation, assignee of the present invention. Under certain flight conditions, it may be necessary or desirable for the pilot to manually override the elevator control motor. This is accomplished when the pilot exerts a force on the control stick of the craft to displace the elevator in a direction opposite to that commanded by the elevator control motor. Unless the trim tab motor is disconnected, the trim tab will be displaced in a direction in accordance with such displacement of the elevator by the force applied to the control stick by the pilot, thereby rendering control of the aircraft difficult and effecting safety of flight.

One object of this invention is to facilitate the control of an aircraft and to insure safety of flight when the pilot manually overrides the control surface motor.

Another object of this invention is to provide novel means for disconnecting the trim tab motor when the control means for disconnecting the trim tab motor when the control surface motor is manually overridden.

Another object of this invention is to provide means responsinve to a predetermined level of the force exerted to manually override the control surface motor for disconnecting the trim tab motor.

Another object of this invention is to provide means responsive to the direction of the force exerted to manually override the control surface motor for disconnecting the trim tab motor.

Another object of this invention is to provide means whereby the trim tab motor is manually disconnected.

Another object of this invention is to provide means for comparing the signal for operating the control surface and trim tab motors to the signal corresponding to the force exerted to manually override the control surface motor, and to disconnect the trim tab motor in accordance with said comparison.

This invention contemplates, for an aircraft having a control surface equipped with a trim tab, a control system comprising: means for providing an error signal; first means connected to the error signal means for controlling the control surface in response to the error signal; second means connected to the error signal means for controlling the trim tab in response to the error signal; pilot operated means for controlling the control surface in a sense so as to override the control rendered thereupon by the first means, and for providing a signal when said overriding control is effected; and means connected to the pilot operated means and connected to the second means and responsive to the signal provided by the pilot operated means for rendering the second means ineffective to control the trim tab.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings, wherein corresponding numerals indicate corresponding parts:

Figure 1:
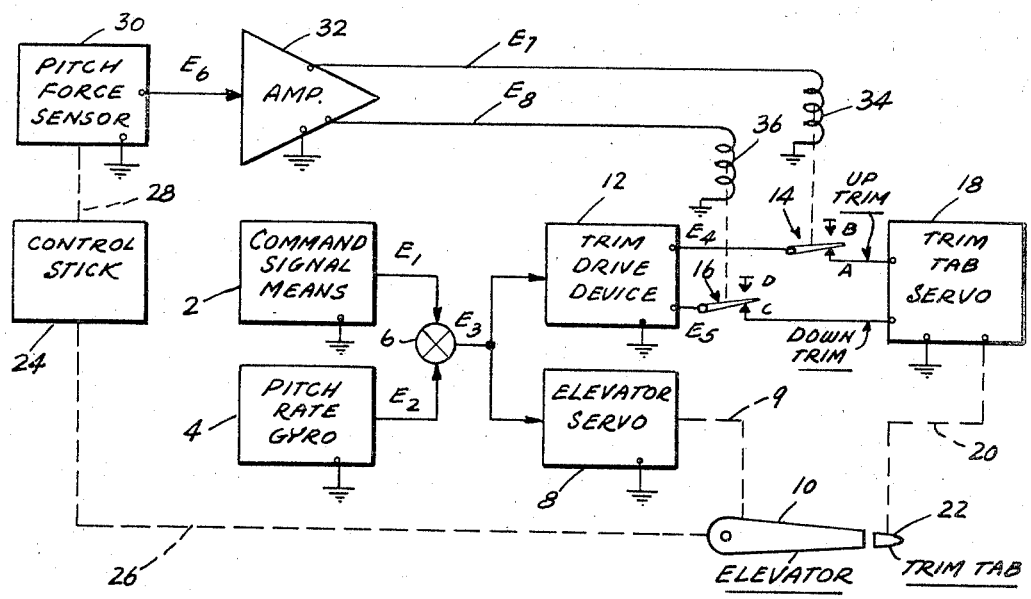
FIGURE 1 is a block diagram showing a first form of the invention including means responsive to the magnitude and direction of the force exerted to manually override the control surface motor for disconnecting the trim tab motor.

With reference to FIGURE 1, there is indicated by the numeral 2 a suitable command signal means which may, for purposes of illustration, be a radio beam responsive device providing a pitch command signal $E_1$. A rate gyro 4 provides a pitch rate signal $E_2$. Pitch command signal $E_1$ from command signal means 2 and pitch rate signal $E_2$ from rate gyro 4 are applied to a summation means 6 which provides an error signal $E_3$. Error signal $E_3$ is applied to a control device such as an elevator servo 8 which includes a motor coupled by suitable mechanical means 9 to an aircraft elevator 10 for displacing elevator 10 either up or down depending on the polarity of error signal $E_3$.

Error signal $E_3$ is also applied to a trim drive device 12. Trim drive device 12 provides an up-trim signal $E_4$ when error signal $E_3$ is of a polarity so as to cause elevator servo 8 to displace elevator 10 downward, and provides a down-trim signal $E_5$ when error signal $E_3$ is of an opposite polarity so as to cause elevator servo 8 to displace elevator 10 upward. Up-trim signal $E_4$ is applied to a control device such as a trim tab servo 18 through a switch 14 which is spring biased to a position A by a relay 34, and down-trim signal $E_5$ is applied to trim tab servo 18 through a switch 16 which is spring biased by a relay 36 to a position C. Trim tab servo 18 includes a motor coupled by suitable mechanical means 20 to an elevator trim tab 22 for displacing trim tab 22 up or down in response to either up-trim signal $E_4$ or down-trim signal $E_5$. Trim tab servo 18 operates to counterposition trim tab 22 relative to the position effected upon elevator 10 by elevator servo 8, thereby trimming elevator 8 as heretofore noted.

The elevator 10 may be pilot operated by a control stick 24 which is coupled by suitable mechanical means 26 to elevator 10. Control stick 24 may be a device such as that disclosed and claimed in U.S. Patent No. 3,027,585, issued Oct. 9, 1962 to J. C. Ziegler et al. and assigned to The Bendix Corporation, assignee of the present invention, whereby the pilot, by exerting a force on control stick 24, overrides elevator servo 8 causing elevator 10 to be displaced in a direction opposite to that commanded by elevator servo 8 in response to error signal $E_3$.

There is coupled to control stick 24 by suitable mechanical means 28 a force sensor 30. Force sensor 30 may be a device such as that disclosed and claimed in U.S. Patent No. 3,115,890, issued Jan. 28, 1964, to Norman B. Murphy and assigned to The Bendix Corporation, assignee of the present invention, and provides a signal $E_6$ having an amplitude corresponding to the magnitude and a phase dependent upon the direction, respectively, of the force exerted by the pilot on control stick 24 and thereby on elevator 10 in an upward or downward sense as the case may be. Signal $E_6$ from force sensor 30 is applied to a phase sensitive amplifier 32. When signal $E_6$ exceeds a predetermined threshold level and is of one phase, indicative of a force applied in an upward direction, amplifier 32 provides an energizing signal $E_7$, and when signal $E_6$ exceeds the predetermined threshold level and is of another phase, indicative of a force applied in a downward direction, amplifier 32 provides an energizing signal $E_8$. Energizing signal $E_7$ is applied to relay 34 and energizes relay 34 which actuates switch 14 from position A to position B, thereby rendering up-trim signal $E_4$ ineffective for controlling trim tab servo 18 when the force applied by the pilot through the control stick 24 to the pitch force sensor 30 is in an upward direction. Energizing signal $E_8$ is applied to relay 36 and energizes relay 36 which actuates switch 16 from position C to position D, thereby rendering down-trim signal $E_5$ ineffective for controlling trim tab servo 18 when the force applied by the pilot through the control stick 24 to the pitch force sensor 30 is in an opposite downward direction.

Figure 2:
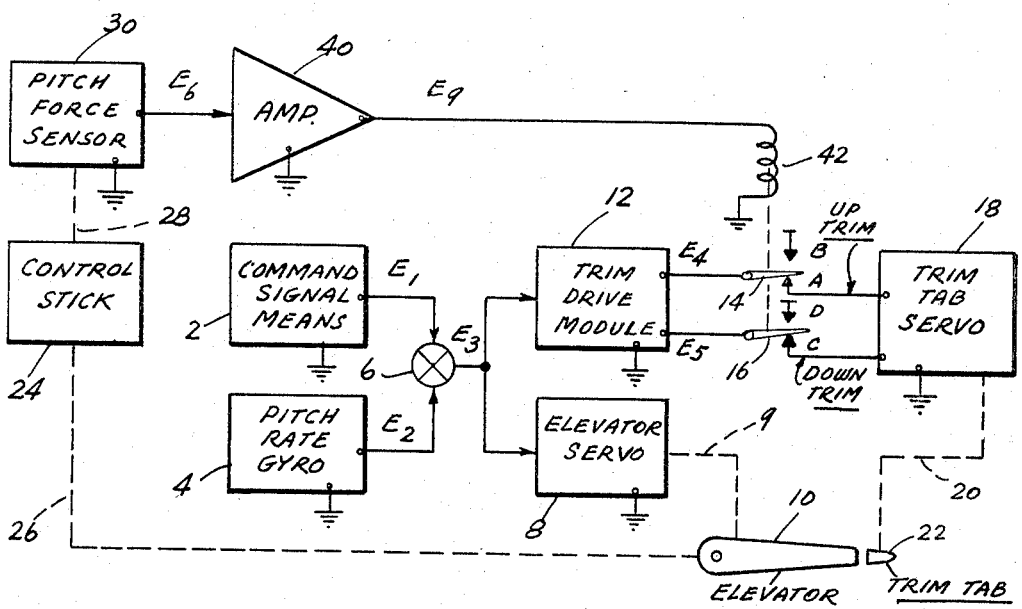
FIGURE 2 is a block diagram showing a second form of the invention including means responsive to the magnitude of the force exerted to manually override the control surface motor for disconnecting the trim tab motor.

With reference to FIGURE 2, wherein the second form of the invention is shown, signals $E_1$ and $E_2$ from command signal means 2 and pitch rate gyro 4, respectively, are applied to summation means 6 which provides error signal $E_3$. Error signal $E_3$ is applied to elevator servo 8 which is coupled to elevator 10 by suitable mechanical means 9 for controlling elevator 10. Error signal $E_3$ is also applied to trim drive module 12 which provides up-trim signal $E_4$ and down-trim signal $E_5$. Signals $E_4$ and $E_5$ are applied to trim tab servo 18 through switches 14 and 16 which are biased by suitable spring means in a relay 42 to position A and to position C, respectively. Trim tab servo 18 is coupled by suitable mechanical means 20 to trim tab 22 and counterpositions trim tab 22 relative to the position effected upon elevator 10 by elevator servo 8 as heretofore noted with reference to FIGURE 1.

When elevator 10 is pilot operated through control stick 24 to override elevator servo 8, force sensor 30 provides signal $E_6$ which is applied to an amplitude sensitive amplifier 40. Amplifier 40 provides an energizing signal $E_9$ when signal $E_6$ exceeds a predetermined threshold level. Energizing signal $E_9$ is applied to relay 42 and energizes relay 42 which actuates switch 14 from position A to position B and actuates switch 16 from position C to position D, thereby rendering up-trim signal $E_4$ and down-trim signal $E_5$ ineffective for controlling trim tab servo 18.

Figure 3:
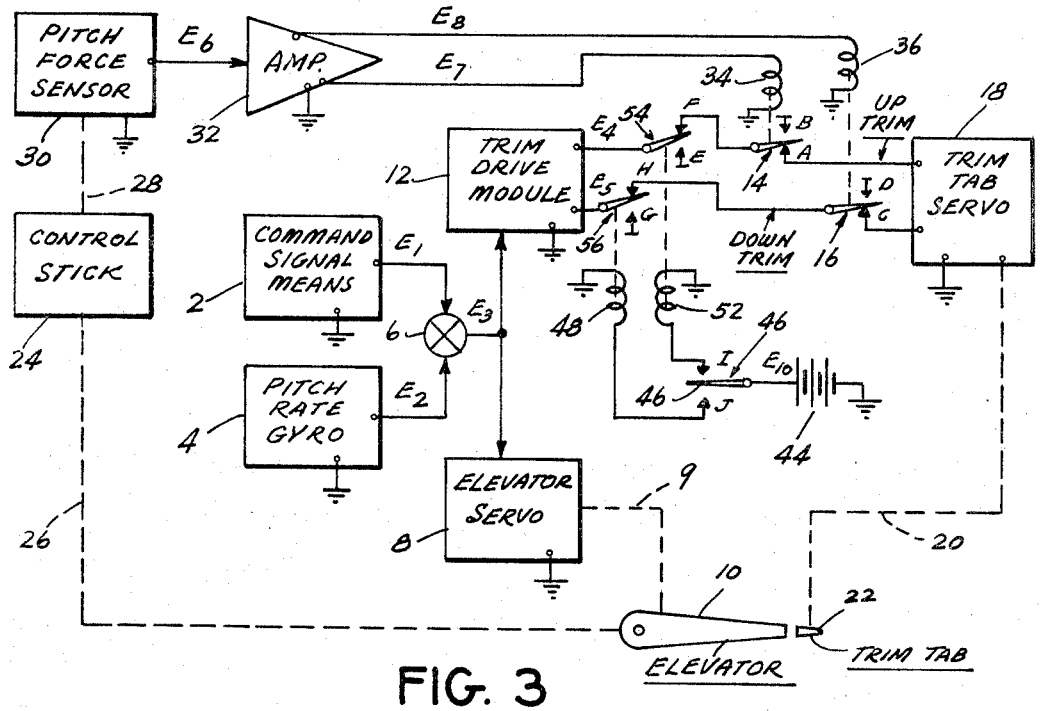
FIGURE 3 is a block diagram showing a third form of the invention including, in combination with the first form of the invention, manually operated means for disconnecting the trim tab motor.

With reference to FIGURE 3 wherein a third form of the invention is shown, there is provided means for manually rendering up-trim signal $E_4$ and down-trim signal $E_5$ ineffective for controlling trim tab servo 18.

Elevator 10 is controlled by elevator servo 8 in response to signal $E_3$, and is also manually controlled by the pilot through control stick 24. The force exerted upon control stick 24 is sensed by pitch force sensor 30 which provides $E_6$. Signal $E_6$ from pitch force sensor 30 is applied to phase sensitive amplifier 32 which provides the energizing signals $E_7$ and $E_8$ for energizing relays 34 and 36, respectively, as heretofore explained with reference to FIGURE 1. Relay 34 actuates switch 14 from position A to position B and relay 36 actuates switch 16 from position C to position D, thereby selectively rendering up-trim signal $E_4$ ineffective for controlling the trim tab servo 18 when the force applied by the pilot through the control stick 24 to the pitch force sensor 30 exceeds a predetermined magnitude in an upward direction and down-trim signal $E_5$ ineffective for controlling trim tab servo 18 when the force applied by the pilot through the control stick 24 to the pitch force sensor 30 exceeds a predetermined magnitude in a downward direction, as heretofore noted with reference to FIGURE 1.

There is also included in the form of the invention shown in FIGURE 3, a switch 54 spring biased to a position F by a relay 52, through which up-trim signal $E_4$ is applied to switch 14, and a switch 56 spring biased to a position H by a relay 48, through which down-trim signal $E_5$ is applied to switch 16. Switches 54 and 56 may be manually controlled by the pilot as will be next described.

A suitable source of direct current such as a battery 44 provides an energizing signals $E_{10}$. Battery 44 has a grounded negative terminal and a positive terminal connected to a switch 46 which is normally biased by suitable spring means to an open switch position, as shown by FIGURE 3. When switch 46 is pilot actuated to a position I, the energizing signal $E_{10}$ is applied to relay 52 and energizes relay 52 which actuates switch 54 from position F to a position E, thereby rendering up-trim signal $E_4$ ineffective for controlling trim tab servo 18. When switch 46 is pilot actuated to a position J, the energizing signal $E_{10}$ is applied to a relay 48 and energizes relay 48 which actuates switch 56 from position H to a position G thereby rendering down-trim signal $E_5$ ineffective for controlling trim tab servo 18.

On certain aircraft it may be desirable to render up-trim signal $E_4$ and down-trim signal $E_5$ ineffective for controlling trim tab servo 18 whenever signal $E_6$ from pitch force sensor 30 differs significantly from error signal $E_3$ provided by summation means 6.

Figure 4:
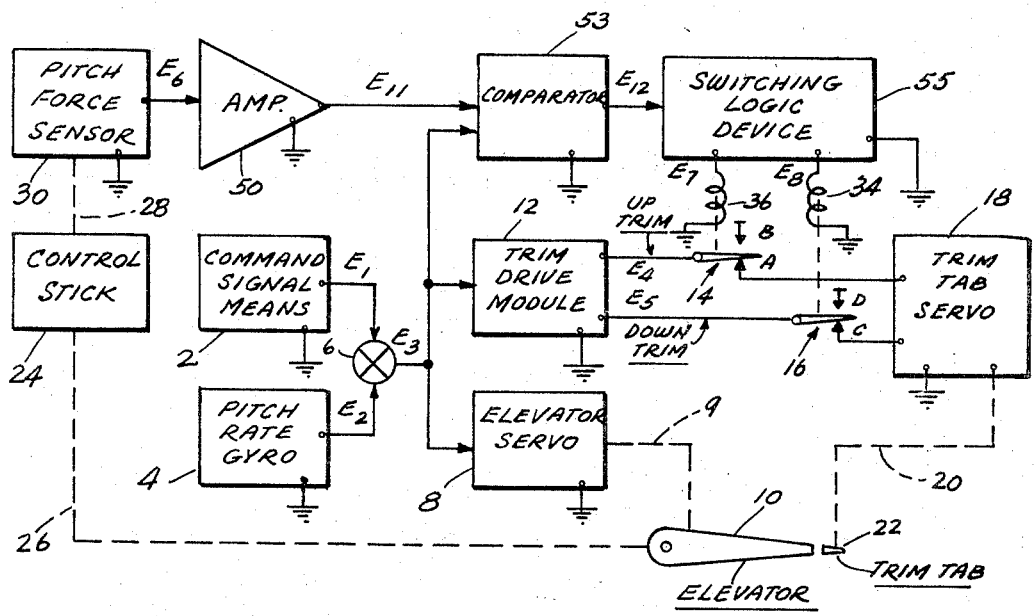
FIGURE 4 is a block diagram showing a fourth form of the invention including means for disconnecting the trim tab motor in accordance with a comparison between the signal for operating the control surface motor and the trim tab motor and the signal corresponding to the force exerted to manually override the control surface motor.

With reference to FIGURE 4, therefore, wherein a fourth form of the invention is shown, elevator 10 is operated by elevator servo 8 or by control stick 24 as heretofore noted with reference to FIGURES 1, 2 and 3. Trim tab 22 is controlled by trim tab servo 18 in response to up-trim signal $E_4$ or down-trim signal $E_5$ applied through switches 14 and 16, respectively, as heretofore noted with reference to FIGURES 1 and 2.

Signal $E_6$ from pitch force sensor 30 is applied to a phase sensitive amplifier 50 which provides a signal $E_{11}$ corresponding in amplitude and polarity to signal $E_6$. Signal $E_{11}$ from amplifier 50 and error signal $E_3$ from summation means 6 are applied to a comparator 53 which compares the signals and provides a signal $E_{12}$ corresponding to the difference therebetween.

Signal $E_{12}$ is applied to a switching logic device 55 which provides energizing signal $E_7$ when the difference signal $E_{12}$ exceeds a predetermined threshold and is of one polarity indicative that the predominating signal be it the error signal $E_3$ or the pitch force sensor signal $E_{11}$ is acting in an upward control sense and the switching logic device 55 further provides energizing signal $E_8$ when signal $E_{12}$ exceeds the predetermined threshold and is of the opposite polarity indicative that the predominating signal $E_3$ or $E_{11}$ is acting in a downward control sense. Signal $E_7$ is applied to relay 36 and energizes relay 36 which actuates switch 14 from position A to position B to render up-trim signal $E_4$ ineffective to control trim tab servo 18 when the predominating signal $E_3$ or $E_{11}$ is acting in the upward control sense and signal $E_8$ is applied to relay 34 and energizes relay 34 which actuates switch 16 from position C to position D to render down-trim signal $E_5$ ineffective to control trim tab servo 18 when the predominating signal $E_3$ or $E_{11}$ is acting in a downward control sense. Thus the predominating signal $E_3$ or $E_{11}$ acts to prevent signal $E_4$ or $E_5$ from being applied to the trim tab servo 18 when the signals $E_3$ and $E_{11}$ differ from one another by the predetermined threshold.

Operation

In order to facilitate control of the aircraft and to insure safety of flight when the pilot manually overrides elevator servo 8, trim tab servo 18 must be rendered ineffective for displacing trim tab 22. The device constructed in accordance with the present invention provides novel means for accomplishing this, both automatically as a function of the magnitude and direction of the force exerted in manually overriding elevator servo 8, and by pilot operated means.

In the first form of the invention as shown in FIGURE 1, the signals $E_7$ and $E_8$ are in accordance with the magnitude and direction of the overriding force, and energize relays 34 and 36 which actutae switches 14 and 16, respectively, to render up-trim signal $E_4$ and down-trim signal $E_5$ effected by the error signal $E_3$ ineffective to control trim tab servo 18 in a sense the same as that called for by the pilot in applying manually an overriding force to the control stick 24 to position the elevator 10.

In the second form of the invention as shown in FIGURE 2, energizing signal $E_9$ is in accordance with the magnitude of the overriding force. Signal $E_9$ energizes relay 42 which actuates switch 14 and switch 16 to render both up-trim signal $E_4$ and down-trim signal $E_5$ effected by the error signal $E_3$ ineffective for controlling trim tab servo 18 upon the pilot applying the overriding force to the control stick 24 to position the elevator 10.

In the third form of the invention, as shown in FIGURE 3, the novel feature shown with reference to FIGURE 1 is combined with the additional feature of providing manually operated switch 46, whereby the pilot may selectively render up-trim signal $E_4$ and down-trim signal $E_5$ ineffective for controlling trim tab servo 18 whenever conditions of flight indicate that such action is necessary.

In the fourth form of the invention as shown in FIGURE 4, comparator 53 provides signal $E_{12}$ in accordance with the difference between error signal $E_3$ from summation means 6 and signal $E_{11}$ applied from sensor 30 through amplifier 50. Switching logic device 55 selectively provides energizing signals $E_7$ and $E_8$ so that the predominating signal, be it the error signal $E_3$ or the pilot induced overriding signal $E_{11}$, serves to control the selective action of the relays 34 and 36. In the case where the pilot induced overriding signal $E_{11}$ predominates, signal $E_{11}$, of course, selectively energizes the relay 34 or 36 to prevent the error signal $E_3$ from applying an up-trim or down-trim signal $E_4$ or $E_5$ to the trim tab servo 18 which would otherwise tend to position the trim tab 22 in an undesired sense or the same as the manual positioning of the elevator 10 by the pilot through the overriding positioning of the control stick 24. The arrangement is such that signal $E_{11}$ controls the selective action of the relays 34 and 36 and the force sensor 30 has the capability that, whenever a maximum force is exerted by the pilot on the control stick 24 to override the positioning of elevator 10 effected by elevator servo 8, the output signal $E_6$ will be of sufficient magnitude as to cause the signal $E_{11}$ to predominate in the comparator 53 the error signal $E_3$. Thus, such an arrangement prevents the error signal $E_3$ from applying an up-trim signal $E_4$ or a down-trim signal $E_5$ to the trim tab servo 18 whenever the maximum force is exerted by the pilot on the control stick 24.

In other cases in which the error signal $E_3$ may predominate, such a condition would be indicative that the positioning of control stick 24 is not sufficient to override the positioning of elevator 10 effected by elevator servo 8. This would cause the resultant difference signal $E_{12}$, effective by an up-trim or down-trim error signal $E_3$, to act through the switching logic device 55 in a sense to selectively energize, respectively, the relay 34 or 36 to prevent a non-existent down-trim or up-trim error signal $E_3$ from applying a down-trim or up-trim signal $E_4$ or $E_5$, respectively, as the case may be.

Although several embodiments of the invention have been illustrated and described, various changes in the form and relative arrangements of the parts, which will now appear to those skilled in the art may be made without departing from the scope of the invention. For example, although the description of the invention has been confined to a system for controlling an aircraft about its pitch axis, it is to be understood that the system relates equally as well to controlling the aircraft about its other flight axes. Reference is, therefore, to be had to the appended claims for a definition of the limits of the invention.

What is claimed is:
1. For an aircraft having a control surface equipped with a trim tab, a control system comprising:
   means for providing an error signal;
   first means connected to the error signal means for automatically controlling the control surface in response to the error signal;
   second means connected to the error signal means for automatically controlling the trim tab in response to the error signal;
   pilot operated means for controlling the control surface in a sense so as to override the control rendered thereupon by the first means, and for providing a signal when said overriding control is effected; and
   means connected to the pilot operated means and connected to the second means and responsive to the signal provided by the pilot operated means for rendering the second means ineffective to control the trim tab without disconnecting the first means.

2. A control system as defined by claim 1 wherein the second means includes:
   third means connected to the error signal means for providing a first signal when the error signal is of one polarity and for providing a second signal when the error signal is of the opposite polarity;
   trim tab operating means;
   fourth means connected to the third means and connected to the trim tab control means for rendering the trim tab control means effective to displace the trim tab in one direction in response to the first signal; and
   fifth means connected to the third means and connected to the trim tab control means for rendering the trim tab control means effective to displace the trim tab in the opposite direction in response to the second signal.

3. A control system as defined by claim 1, wherein the pilot operated means includes:
   a control stick;
   means for coupling the control stick to the control surface so as to effect upon the control surface a displacement opposite in direction to that effected thereupon by the first means when the pilot exerts an overriding force on the control stick; and
   a force sensor connected to the control stick for providing a signal corresponding to the overriding force exerted by the pilot.

4. A control system as defined by claim 3, wherein:
   the signal provided by the force sensor is of one phase when the overriding force is exerted in one direction and is of another phase when the overriding force is exerted in the opposite direction; and
   said signal provided by the force sensor has an amplitude proportional to the magnitude of the overriding force.

5. A control system as defined by claim 1, wherein:
   the control surface; and
   the trim tab are operated oppositely by the first and second means respectively in response to the error signal.

6. A control system as defined by claim 4, wherein the means connected to the pilot operated means and connected to the second means and responsive to the signal provided by the pilot operated means for rendering the second means ineffective to control the trim tab comprises:
  phase sensitive means connected to the force sensor for providing a third signal when the signal provided by the force sensor exceeds a predetermined threshold and is of the one phase, and for providing a fourth signal when the signal provided by the force sensor exceeds the predetermined threshold and is of the other phase;
  sixth means connected to the phase sensitive means and connected to the fourth means for disconnecting the fourth means from the trim tab means in response to the third signal, thereby rendering the trim tab control means ineffective to displace the trim tab in the one direction in response to the first signal; and
  seventh means connected to the phase sensitive means and connected to the fifth means for disconnecting the fifth means from the trim tab control means in response to the fourth signal, thereby rendering the trim tab control means ineffective to displace the trim tab in the opposite direction in response to the second signal.

7. A control system as defined by claim 3, including:
  amplitude sensitive means connected to the force sensor for providing a signal when the signal provided by the force sensor exceeds a predetermined amplitude; and
  control means connected to the amplitude sensitive means being operatively connected to both the fourth means and the fifth means for disconnecting the fourth and fifth means from the trim tab means in response to the fifth signal, thereby rendering the trim tab control means ineffective to displace the trim tab in the one direction and in the other direction.

8. A control system as defined by claim 2 wherein the pilot operated means comprises:
  a first switch for connecting the third means to the fourth means;
  a second switch for connecting the third means to the fifth means;
  means for providing an energizing voltage;
  a third switch connected to the means for providing an energizing voltage;
  a first relay operatively connected to the first switch, said first relay being selectively energized by the energizing voltage upon the third switch being actuated to a first predetermined position so as to render the first relay effective to position the first switch in a sense to disconnect the third means from the fourth means;
  a second relay operatively connected to the second switch, said second relay being selectively energized by the energizing voltage upon the third switch being actuated to a second predetermined position so as to render the second relay effective to position the second switch in a sense to disconnect the third means from the fifth means.

9. A control system as defined by claim 4 including:
  phase sensitive means connected to the force sensor for providing a signal of one polarity when the signal from the force sensor is of the one phase, and for providing the signal of another polarity when the signal from the force sensor is of the other phase;
  a comparator connected to the error signal means and to the phase sensitive means for providing a differential signal in accordance with a comparison between the error signal and the signal from the phase sensitive means; and
  means connected by the comparator and connected to the second means and responsive to the signal provided by the comparator for rendering the second means ineffective to control the trim tab.

References Cited

UNITED STATES PATENTS 2,623,717  12/1952  Price _____ 244—82
3,193,219  7/1965  Parker et al. _____ 244—77

FERGUS S. MIDDLETON, *Primary Examiner.*